United States Patent
Builta et al.

(10) Patent No.: US 8,078,395 B2
(45) Date of Patent: Dec. 13, 2011

(54) CONTROL SYSTEM FOR AUTOMATIC CIRCLE FLIGHT

(75) Inventors: Kenneth E. Builta, Euless, TX (US);
James E. Harris, Dalworthington Gardens, TX (US); Billy K. Gore, Euless, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 965 days.

(21) Appl. No.: 12/064,490

(22) PCT Filed: Nov. 15, 2005

(86) PCT No.: PCT/US2005/041015
§ 371 (c)(1),
(2), (4) Date: Feb. 22, 2008

(87) PCT Pub. No.: WO2007/058643
PCT Pub. Date: May 24, 2007

(65) Prior Publication Data
US 2008/0243371 A1      Oct. 2, 2008

(51) Int. Cl.
*G01C 21/00* (2006.01)

(52) U.S. Cl. ........ 701/203; 701/200; 701/201; 701/202; 701/204; 701/205; 340/870.02; 340/945; 340/947; 340/951; 340/961; 244/1 R; 244/76 R; 244/181; 244/186; 342/357.31

(58) Field of Classification Search .............. 701/3, 4, 701/5, 7, 8, 9, 10, 14, 16, 18, 120, 121, 123, 701/200, 201, 202, 203, 204, 205, 206, 210, 701/301; 340/870.02, 945, 947, 951, 961, 340/963, 970, 973, 974, 976; 244/1 R, 76 R, 244/181, 186; 342/357.31
See application file for complete search history.

(56) References Cited

U.S. PATENT DOCUMENTS
3,373,994 A     3/1968  Woodward
(Continued)

FOREIGN PATENT DOCUMENTS
JP    2000272592 A    10/2000
JP    2003118695 A     4/2003

OTHER PUBLICATIONS
Office Action dated Feb. 17, 2010 from a counterpart European Application No. 05858317.0.
(Continued)

*Primary Examiner* — James Trammell
*Assistant Examiner* — McDieunel Marc
(74) *Attorney, Agent, or Firm* — James E. Walton; Richard G. Eldredge

(57) ABSTRACT

A flight control system for an aircraft is configured for receiving command signals representing commanded values of a location of a geospatial point and a radius about the geospatial point for defining a circular groundtrack. A sensor determines a geospatial location of the aircraft and provides a location signal representing the location of the aircraft. A controller for commanding flight control devices on the aircraft controls the flight of the aircraft and is configured to receive the command signals and the location signal. The controller uses the command signals and location signal to operate the flight control devices to control the flight of the aircraft for directing the aircraft generally toward a tangent point of the circular groundtrack and then maintaining a flight path along the circular groundtrack.

18 Claims, 5 Drawing Sheets

U.S. PATENT DOCUMENTS

| | | | | |
|---|---|---|---|---|
| 4,416,436 | A | | 11/1983 | Wilson, Jr. |
| 4,959,015 | A | * | 9/1990 | Rasinski et al. ............. 434/2 |
| 5,722,618 | A | | 3/1998 | Jacobs et al. |
| 6,847,866 | B2 | * | 1/2005 | Gaier ............................. 701/4 |
| 6,933,857 | B2 | * | 8/2005 | Foote ..................... 340/870.02 |
| 7,099,752 | B1 | * | 8/2006 | Lenell et al. ................... 701/2 |
| 7,225,063 | B2 | * | 5/2007 | Tart et al. ....................... 701/4 |
| 7,752,018 | B2 | * | 7/2010 | Rahmes et al. ................. 703/2 |
| 7,840,317 | B2 | * | 11/2010 | Matos et al. ................... 701/16 |
| 2004/0230351 | A1 | | 11/2004 | Rumbo et al. |
| 2005/0004723 | A1 | | 1/2005 | Duggan et al. |

OTHER PUBLICATIONS

Response to the Office Action dated Feb. 17, 2010 from a counterpart European Application No. 05858317.0.

Sebastian Stolle, et al. "Flight path following guidance for unmanned air vehicles with pan tilt cameras for target observation", 2003, XP01668909, Digital Systems Avionics Conference, 2003. DASC '03., vol. 2, pp. 8.B.3.1-8.B.3.12, ISBN: 0-7803-7844-X.

European Office Action dated Jun. 16, 2010 from a counterpart European Application No. 05858317.0.

Response to the EP Office Action dated Jun. 16, 2010.

Japanese Examination Report from JP counterpart Application No. 2008-541131, issued by the Japanese Patent Office on Apr. 28, 2011.

Office Action dated Jun. 19, 2009 from a Chinese Counterpart Application.

Supplementary European Search Report dated Dec. 18, 2009 from a European Counterpart Application.

* cited by examiner

CONTROL SYSTEM FOR AUTOMATIC CIRCLE FLIGHT

TECHNICAL FIELD

The present invention relates generally to the field of flight control systems for aircraft and relates particularly to a system for achieving and maintaining a circular flight path around a selected fixed or moving point.

DESCRIPTION OF THE PRIOR ART

It is often desirable to fly an aircraft in a path that describes a closed-loop ground track around a particular area of interest, such as the site of an accident or an area being searched. One of the benefits is that the aircraft maintains a distance from the area, providing for a continual line-of-sight from the aircraft toward the area of interest.

When the aircraft is being flown under manual control, whether by a pilot onboard the aircraft or by a pilot remotely operating the aircraft, the pilot may maintain the desired path around the area by observing the area of interest and controlling the flight of the aircraft in response to the observation. One way that this may be accomplished is for the pilot to fly the aircraft in a banked attitude, maintaining a generally constant turn for circling the area of interest. The pilot may attempt to fly the aircraft in a circular path about a particular point, which could be located by conventional navigation means such a radio signals or by using the Global Positioning System. To maintain a circular path, the pilot must maintain a constant radial distance from the selected point.

An alternative method for flying a closed loop is by flying to waypoints and turning the aircraft toward the next waypoint in a looping sequence. This method is illustrated in FIG. 1, which depicts a generally circular path 13 around an area of interest 11. Path 13 is defined by a number of waypoints and the flight segments connecting adjacent waypoints. As shown, path 13 comprises eight waypoints, labeled A through H, though path 13 may comprise more or fewer waypoints. The pilot flies the aircraft from each waypoint to the adjacent waypoint, and the path may be flown in either direction. For example, an aircraft may begin path 13 at waypoint A and fly along segment 15 straight toward waypoint B. At waypoint B, the pilot turns the aircraft straight toward waypoint C, flying the aircraft along segment 17. The pilot continues flying to subsequent waypoints along straight segments and completes path 13 by flying from waypoint H to waypoint A along segment 19. The pilot may then continue on path 13 by flying again to waypoint B.

The requirement that the onboard or remote pilot manually fly the aircraft in the desired path increases the pilot's workload and reduces the ability of the pilot to observe the area of interest. Also, it may be difficult for the pilot to maintain a desired distance from the location while circling, especially in windy conditions. For the waypoint method to describe a circular path, the path must have a large radius and/or many waypoints. Selecting such a set of waypoints may be difficult and time consuming.

Many modern aircraft, including manned and unmanned aircraft, have flight control systems for maintaining selected flight parameters at or near selected values. These parameters may include altitude, heading, ground track, attitude, and/or velocity, and the control system maintains each parameter through commands sent to flight control systems of the aircraft. Velocity may be controlled as the airspeed or inertial velocity of the aircraft. Airspeed is defined as the forward velocity of the aircraft relative to the air mass in which the aircraft is flying, whereas inertial velocity is defined as the velocity of the aircraft relative to the ground over which the aircraft is flying.

Existing flight control systems provide for automatic flight along a closed-loop path by flying to waypoints. Alternatively, an aircraft may be commanded to loiter around or near an area, in which the flight control systems fly the aircraft in complicated patterns or ground tracks. For example, some systems will control aircraft to fly over a selected point on the ground, which may be given as GPS coordinates or by other coordinate systems, then turn the aircraft around to fly over the same point again. The ground tracks of these paths may be regular patterns, such as a "figure-8" pattern, or the paths may be of irregular shapes. The disadvantage of these systems is that they may not provide for a continual line-of-sight or may require repositioning of observers or devices on the aircraft to continue observations of the area of interest.

SUMMARY OF THE INVENTION

There is a need for a flight control system that provides for automatic flight around a circle of a commanded center and radius at a commanded altitude and velocity.

Therefore, it is an object of the present invention to provide a flight control system that provides for automatic flight around a circle of a commanded center and radius at a commanded altitude and velocity.

A flight control system for an aircraft is configured for receiving command signals representing commanded values of a location of a geospatial point and a radius about the geospatial point for defining a circular groundtrack. A sensor determines a geospatial location of the aircraft and provides a location signal representing the location of the aircraft. A controller for commanding flight control devices on the aircraft controls the flight of the aircraft and is configured to receive the command signals and the location signal. The controller uses the command signals and location signal to operate the flight control devices to control the flight of the aircraft for directing the aircraft generally toward a tangent point of the circular groundtrack and then maintaining a flight path along the circular groundtrack.

The present invention provides for several advantages, including: (1) the ability for a system to automatically operate an aircraft to fly a circle having a selected center and radius; and (2) the ability to intercept and fly a circle from an initial point located inside or outside of the circle.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

Figure 1:
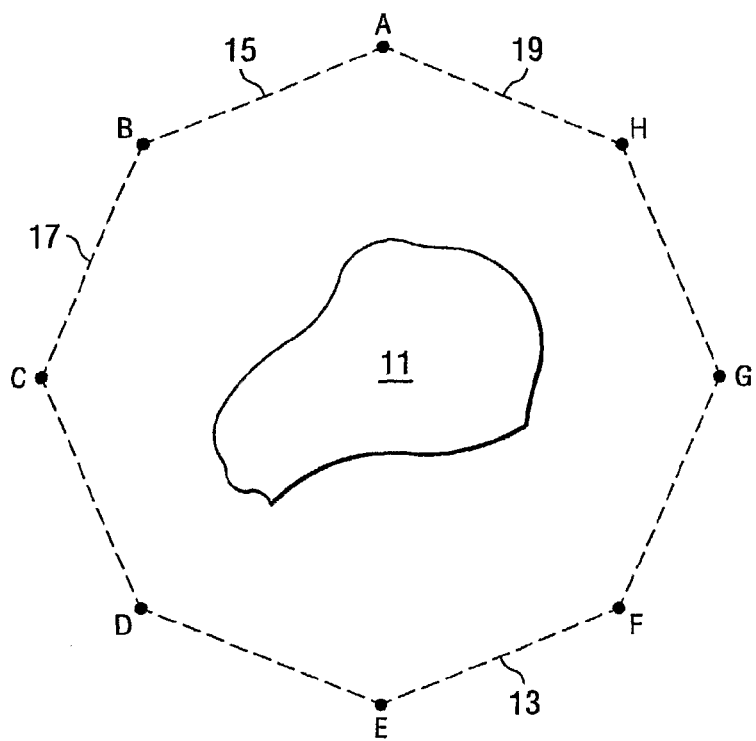
FIG. 1 is a schematic view of the flight path of an aircraft when using a prior-art waypoint method for flying an aircraft around an area of interest.
Figure 2A:
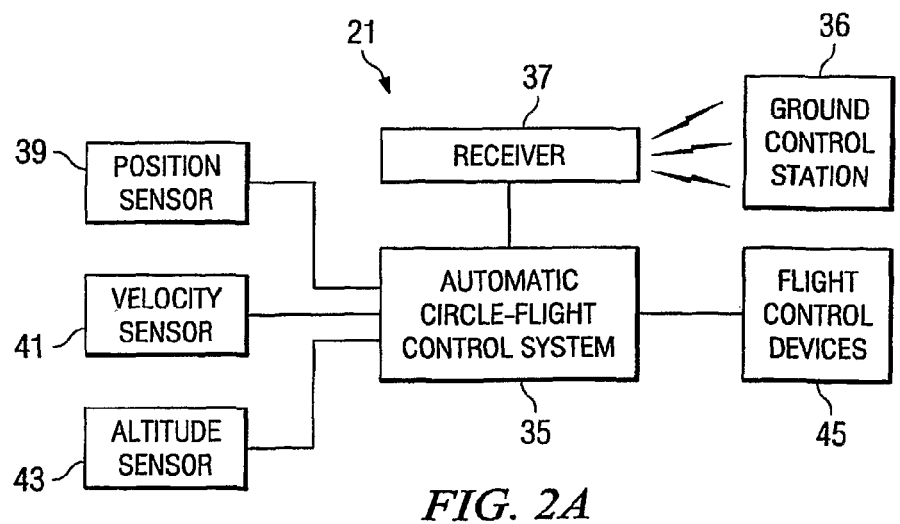
FIG. 2A is a schematic view of a flight control system according to the present invention and configured for use with a remotely-piloted aircraft.
Figure 5:
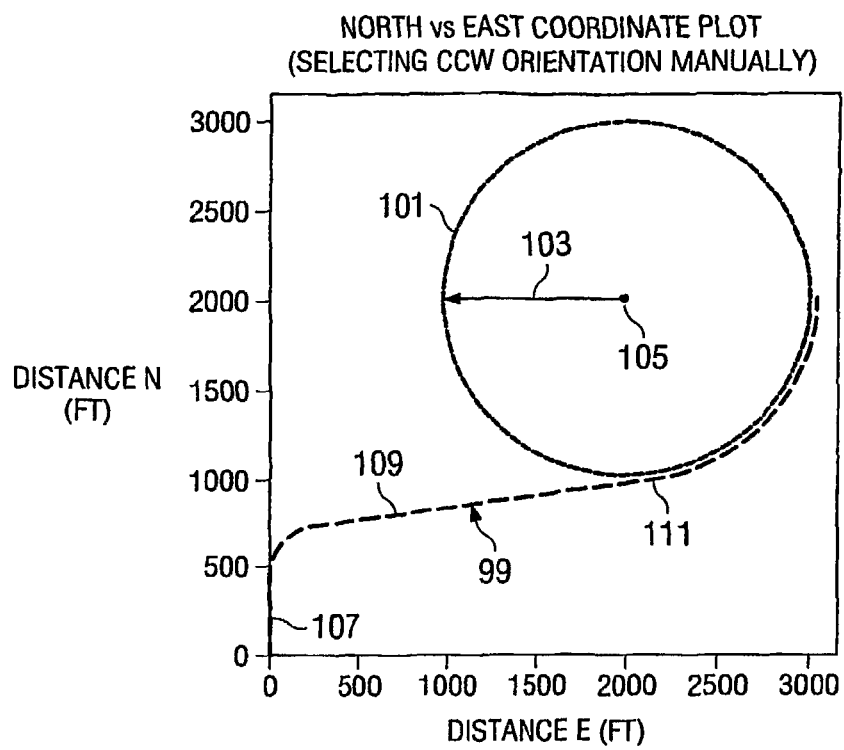
Figure 6:
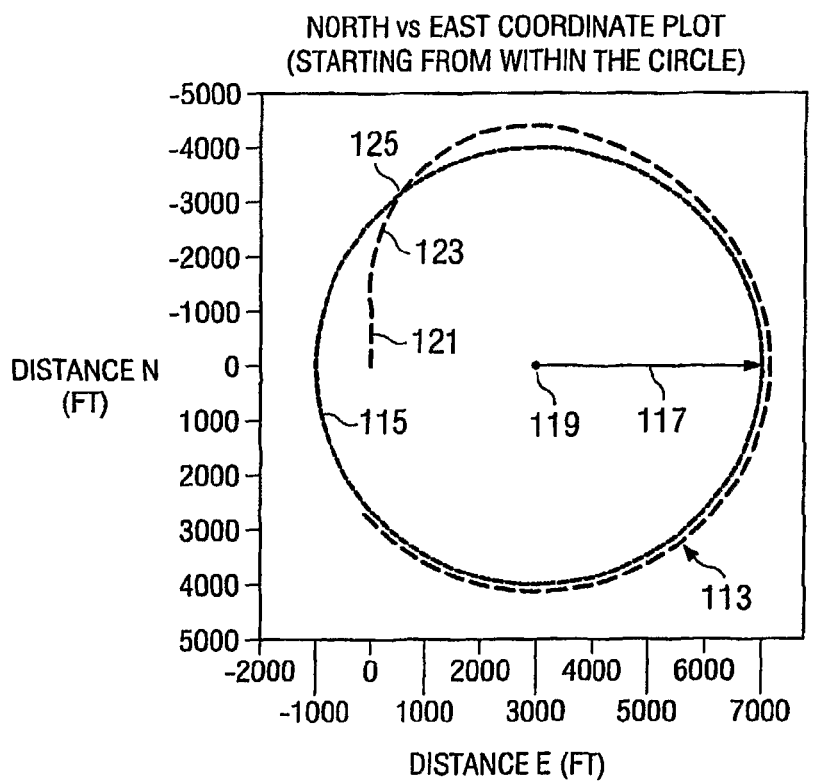
Figure 7:
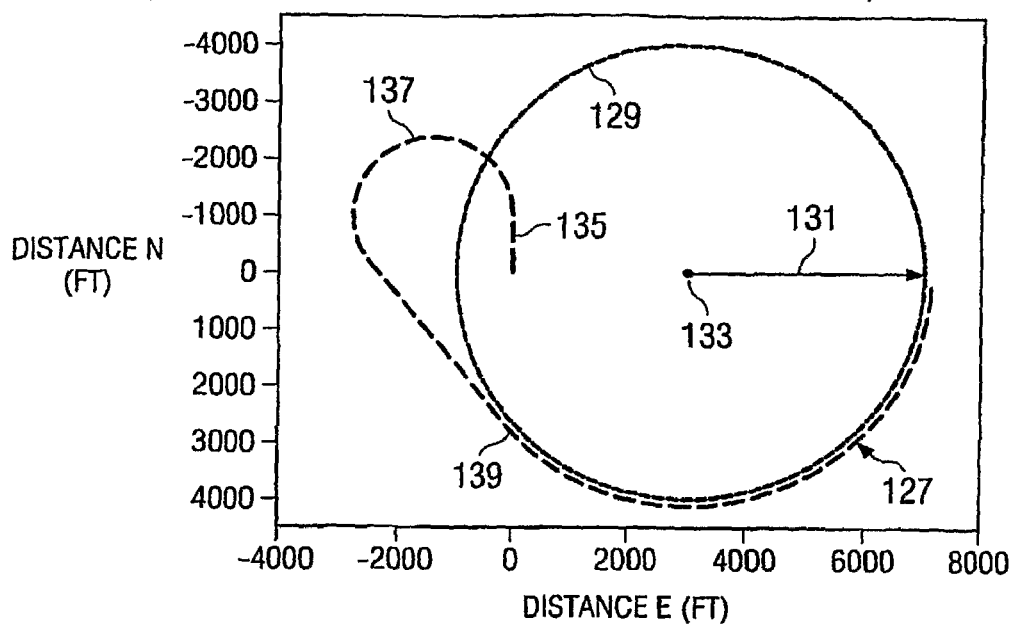
Figure 8:
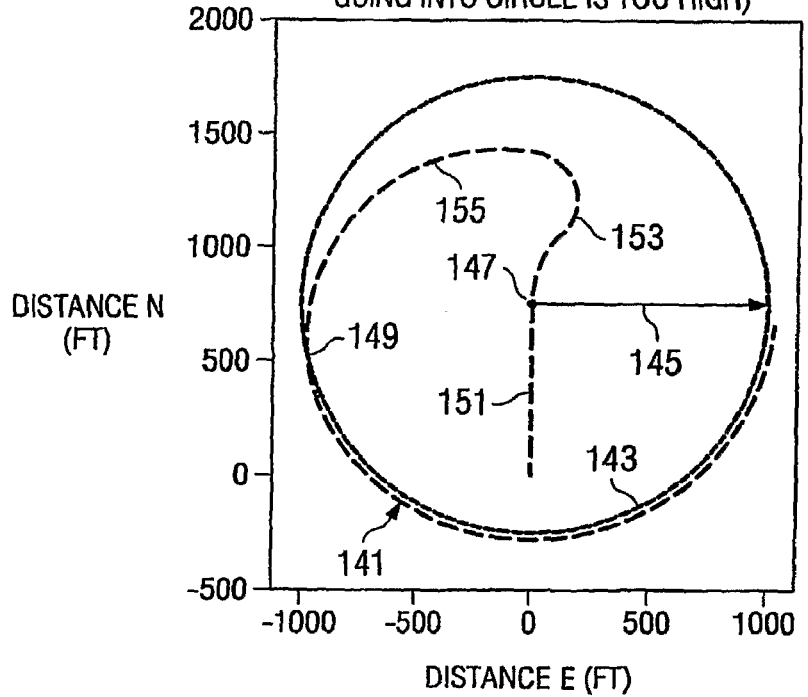

2A to fly a circular path in a clockwise direction, the aircraft having started outside of the prescribed circle;

FIG. 5 is a plot of a ground track of the flight of an aircraft, the flight of the aircraft being controlled by the system of FIG. 2A to fly a circular path in a counter-clockwise direction, the aircraft having started outside of the prescribed circle;

FIG. 6 is a plot of a ground track of the flight of an aircraft, the flight of the aircraft being controlled by the system of FIG. 2A to fly in a circular path in a clockwise direction, the aircraft having started inside of the prescribed circle;

FIG. 7 is a plot of a ground track of the flight of an aircraft, the flight of the aircraft being controlled by the system of FIG. 2A to fly in a circular path in a counter-clockwise direction, the aircraft having started inside of the prescribed circle; and FIG. 8 is a plot of a ground track of the flight of an aircraft, the flight of the aircraft being controlled by the system of FIG. 2A to fly in a circular path in a counter-clockwise direction, the aircraft having started from a position toward a center of the prescribed circle.

DESCRIPTION OF THE PREFERRED EMBODIMENT

The present invention is directed to a flight control system configured for automatically controlling the flight of an aircraft, such that the aircraft flies toward a selected area of interest and circles a selected point in the area at a specified radius, altitude, and velocity. Specifically, the system generates a bank command for banking the aircraft in a turn and uses the bank command with velocity and altitude error signals for flying the selected circular path. The control system requires only one point in space and a radius to define the circle and is useful for controlling the flight of manned and unmanned aircraft of all types, including helicopters, tiltrotors, and fixed-wing aircraft. The system is particularly suited for use in aircraft performing surveillance, search, rescue, and military missions.

For example, a medical evacuation helicopter used to transport trauma patients could use the system when dispatched to the scene of an accident. The dispatcher would provide the helicopter crew with the coordinates of the accident, and the system would enable the helicopter to get there in the fastest possible time without the need to follow landmarks. Likewise, a law enforcement helicopter could be dispatched to a specified location and circle the location without the requirement of input from the pilot. Another example is use of the system for a helicopter used to provide traffic reports, the helicopter being able to quickly and easily get to a specified accident or traffic location and then circle the area. Military aircraft can use the system of the invention for gunships, allowing the aircraft to circle identified targets.

The system of the invention commands an aircraft to automatically fly in a circular path about any selected point (longitude and latitude, or specified in another reference system that has been programmed into the flight control system) by selecting the following parameters: (1) center point of the circle, or circle point; (2) radius of the circle; (3) airspeed or inertial velocity to be flown; (4) altitude to be flown; and (5) direction of rotation about the circle to be flown. It should be noted that the circle pattern can easily be changed into a spiral of any dimension by continuously changing the radius and/or the commanded airspeed. It is also not necessary that the center point of the circle remain fixed. The center point may be a moving target as long as the velocity of the center point is less than the commanded velocity of the aircraft.

Referring to the figures, FIG. 2A is a schematic view of one embodiment of the control system according to the invention. Control system 21 is specifically configured for use with an unmanned, remotely-piloted aircraft, such as aircraft 23 of FIG. 3, though system 21 may alternatively be configured for use with any type of manned or unmanned aircraft. Aircraft 23 is a tiltrotor aircraft propelled by prop-rotors 25, which are rotatably mounted to movable nacelles 27. Each nacelle 27 is capable of pivoting relative to the associated wing 29 between a position corresponding to an airplane mode of flight, shown in the figure, and a position corresponding to a helicopter mode, in which prop-rotors 25 rotate in a generally horizontal plane. Prop-rotors are powered by one or more engines (not shown) carried within fuselage 31 or in each nacelle 27. A turret 33 is rotatably mounted on fuselage 31 to provide for a rotatable mount for sensors (not shown), which may include optical, infra-red, or other types of sensors. System 21 of FIG. 2 is computer-based and preferably carried within aircraft 23, though portions of system 21 may be located remote from the aircraft.

Figure 2B:
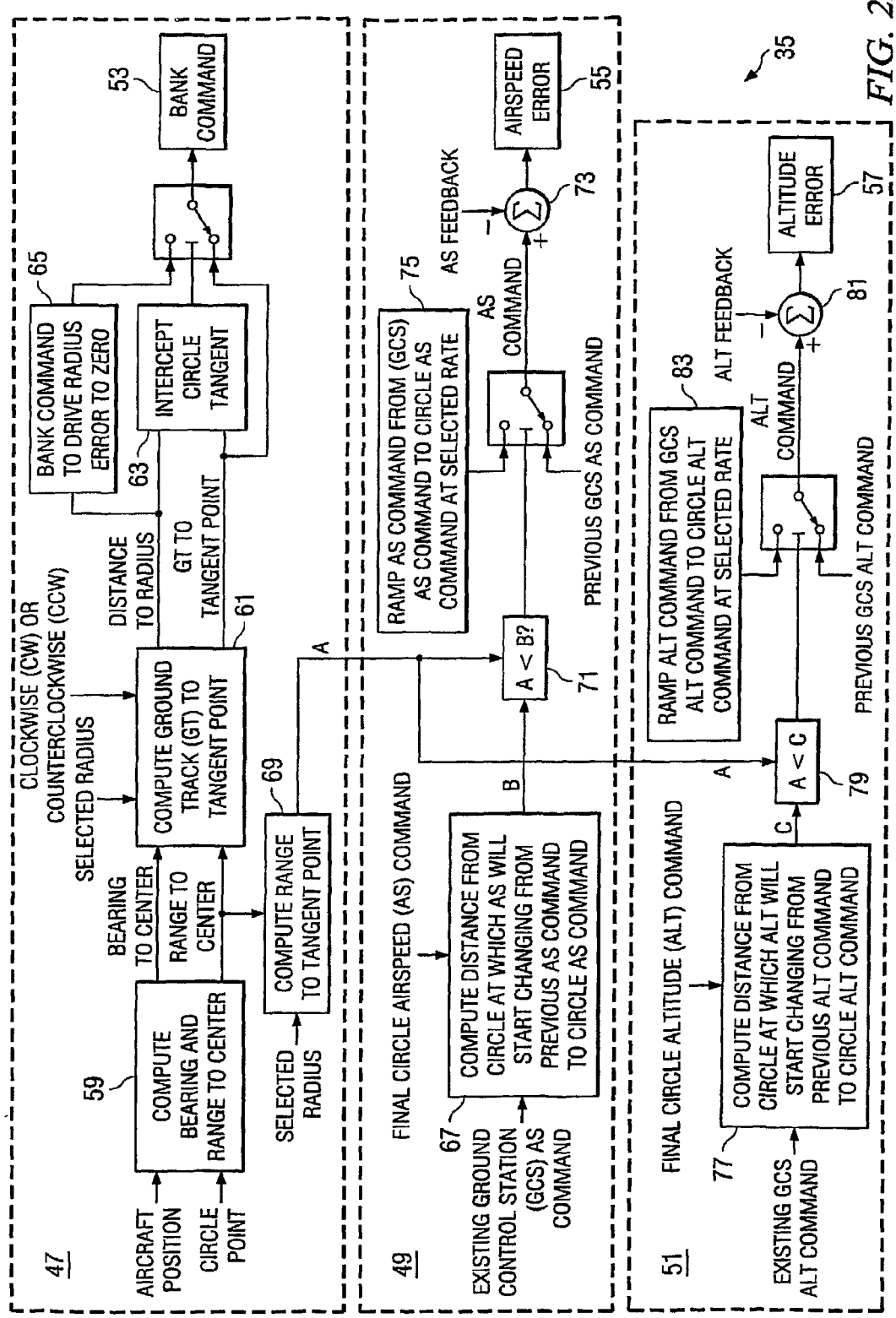
FIG. 2B is a flowchart view of a portion of the flight control system of FIG. 2A.
Figure 3:
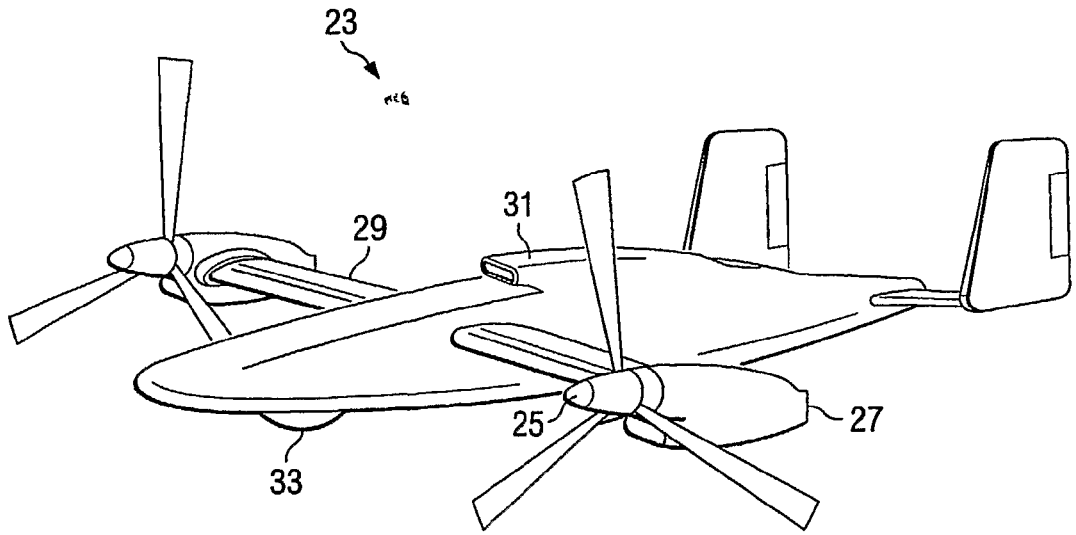
FIG. 3 is a perspective view of an aircraft having the flight control system shown in FIG. 2A.

Referring again to FIG. 2A and to FIG. 2B, system 21 comprises an automatic circle-flight control system 35 that receives command data transmitted from a Ground Control Station (GCS) 36 through a receiver 37 carried on aircraft 23, the command data representing the parameters for the commanded circle maneuver. In addition, system 35 is also provided with data representing the location, velocity, and altitude of aircraft 23. The location data are provided by at least one position sensor 39, such as an inertial navigation sensor (INS), a RADAR system, or a sensor capable of calculating a position from Global Positioning System (GPS) signals. At least one velocity sensor 41 provides the data representing the velocity of aircraft 23, and this velocity may be measured as airspeed and/or inertial velocity for comparison to the commanded velocity to be flown during the circle maneuver. In the embodiment shown, the commanded and measured velocity is the airspeed of aircraft 23. An altitude sensor 43 provides the altitude data, which may be provided as altitude above sea level or as altitude above the local terrain. System 35 uses the data provided by sensors 39, 41, 43 and the command data from receiver 37 to operate flight control devices 45 on aircraft 23 for causing aircraft 23 to fly according to the commanded parameters.

FIG. 2B is a flowchart view of circle-flight control system 35, which comprises three system sections 47, 49, 51, each section 47, 49, 51 performing calculations for affecting one aspect of flight of aircraft 23. Section 47 generates a bank command signal 53, section 49 generates an airspeed error signal 55, and section 51 generates an altitude error signal 57. The combination of signals 53, 55, 57 allows system 35 to command flight control devices 45 for maneuvering aircraft 23 in the commanded path.

In operation, section 47 of system 35 calculates in step 59 the range and bearing to the commanded circle point. These calculations are computed by comparing the position of the circle point, which is provided through receiver 37, to the aircraft location, which is provided by position sensor 39. These calculations are then used in step 61 to determine a ground track, which is a two-dimensional projection of the flight path of aircraft 23 as seen from above aircraft 23, from the current position of aircraft 23 to a point that is tangent to the commanded circle. The ground track is calculated by using the selected radius, which indicates the distance from the center point of the circle to the tangent point, and by using the direction of travel around the circle, which determines which side of the circle the ground track will intercept. The ground track is preferably a straight path that is perpendicular to the radius of the circle at the tangent point, though other paths may be used when necessary, such as for avoiding terrain or evading detection. The selected radius and direction of travel (clockwise or counter-clockwise) are also provided to system 35 through receiver 37. The circle may be approached from either outside or inside of the circle, depending upon the aircraft velocity and position relative to the circle when the commands are given to system 21.

When the distance to the tangent point is greater than the commanded circle radius, section 47 controls the flight of aircraft 23 toward the tangent point. Once step 63 occurs as aircraft 23 intercepts the tangent (or is within a selected range of the tangent point), section 47 begins to generate bank command 53 to continuously fly aircraft 23 along the circumference of the circle. In step 65, the location of aircraft 23 is continuously compared to the circle radius location to determine the distance of aircraft 23 from the circle center. If the distance is greater than the commanded radius, indicating a radius error, step 65 alters bank command 53 to flight control devices 45 in order to drive the radius error to zero.

In the embodiment of FIG. 2B, section 49 of system 35 calculates airspeed error 55, which is used to control throttles or other devices on aircraft 23 for maintaining a selected airspeed. The selected airspeed is either a commanded airspeed when aircraft 23 is flying toward the tangent point of the desired circle (a "fly-to" airspeed) or the commanded airspeed that aircraft 23 is to maintain when flying around the circle (circle airspeed). In addition, section 49 includes a ramping function for changing the airspeed of aircraft 23 from the "fly-to" airspeed to the circle airspeed, if the airspeed values are different. The ramp rate is expressed as a rate of change of airspeed, such as, for example, 1 kt/sec.

At the beginning of section 49, step 67 provides for computation of the distance from the circle at which the ramp rate from the existing airspeed command should begin so that aircraft 23 will be traveling at the selected circle airspeed at approximately the same time aircraft 23 intercepts the circle. This distance output, shown as "B" in the figure, is compared to the output of step 69, which determines the range to the tangent point using the selected radius and the range to the center of the circle, which is output from step 59 of section 47. The output value representing the range to the tangent point is shown as "A" in the figure.

In step 71, values A and B are compared to determine if A is less than B. If not, this means that aircraft 23 is still too far from the tangent intercept point to begin ramping the airspeed, and system 35 continues using the previous "fly-to" airspeed command as the airspeed command output to node 73. The airspeed command output is summed with a feedback signal representing the current airspeed of aircraft 23 for producing airspeed error 55, which is used for operating devices on aircraft 23 to control the airspeed such that airspeed error 55 is minimized. If A is less than B, this means that aircraft 23 is at or within the distance from the tangent point needed to ramp the airspeed at the selected rate. Step 75 produces a new airspeed command output for ramping the airspeed command output at the selected rate from the previous command to the circle airspeed command, and this airspeed command output is summed at node 73 with the airspeed feedback signal for calculating airspeed error 55.

In the same manner as that used in section 49 to calculate airspeed error, section 51 calculates altitude error 57, which is used to operate flight control surfaces or other devices on aircraft 23 for maintaining a selected altitude. The selected altitude is either a commanded altitude when aircraft 23 is flying toward the tangent point of the desired circle (a "fly-to" altitude) or the commanded altitude that aircraft 23 is to maintain when flying around the circle (circle altitude). In addition, section 51 includes a ramping function for changing the altitude of aircraft 23 from the "fly-to" altitude to the circle altitude, if the altitude values are different. The ramp rate is expressed as a rate of change of altitude, such as, for example, 1000 ft/min.

At the beginning of section 51, step 77 provides for computation of the distance from the circle at which the ramp rate from the existing altitude command should begin so that aircraft 23 will be traveling at the selected circle altitude at approximately the same time aircraft 23 intercepts the circle. This distance output is shown as "C" in the figure and is compared in step 79 to output "A" of step 69 to determine if A is less than C. If not, aircraft 23 is still too far from the tangent intercept point to begin ramping the altitude, and system 35 continues using the previous "fly-to" altitude command as the altitude command output to node 81. The altitude command output is summed with a feedback signal representing the current altitude of aircraft 23 for producing altitude error 57, which is used for operating devices on aircraft 23 to control the altitude such that altitude error 57 is minimized. If A is less than C, aircraft 23 is at or within the distance from the tangent point needed to ramp the altitude at the selected rate. Step 83 produces a new altitude command output for ramping the altitude command output at the selected rate from the previous command to the circle altitude command, and this altitude command output is summed at node 81 with the altitude feedback signal for calculating altitude error 57.

It should be noted that the embodiment shown in the figures includes use of airspeed commands to control the velocity of the aircraft, though inertial velocity commands may also or alternatively be used to command the velocity of an aircraft controlled with system 35. Also, certain restraints must be observed in order to achieve the commanded circle. For example, the specified velocity and radius must be compatible to prevent the aircraft from continuously overshooting the circumference of the circle.

In system 21, the commands for system 35 are shown as being transmitted to the aircraft from a ground control station (GCS), though other methods for inputting commands may be used. For example, all commands may be input into system 35 before flight of the aircraft, and this method may be useful when the aircraft is to fly a predetermined route to a circle, fly the circle using the commanded parameters for a selected amount of time, then return to the launch site or land at an alternate location. Alternatively, only selected commands may be input prior to flight, such as the "fly-to" velocity and/or altitude values. It should also be noted that system 35 can easily be used to fly the aircraft in a spiral of any specified dimension by continuously changing the selected radius.

For a piloted aircraft, the locations of interest can be pre-programmed into system 35, the pilot can input data as targets are identified, or locations of interest can be sent to the pilot from any number of sources. In a fully automated system, the pilot would not have to fly the aircraft. System 35 could also be used on a piloted aircraft with or without the ability to fly the circle completely automatically. With the aid of a flight director, the pilot could be given the necessary information by following visual cues provided by system 35 for manually flying the aircraft to the designated circle intercept point and for maintaining the flight around the circle.

Figure 4:
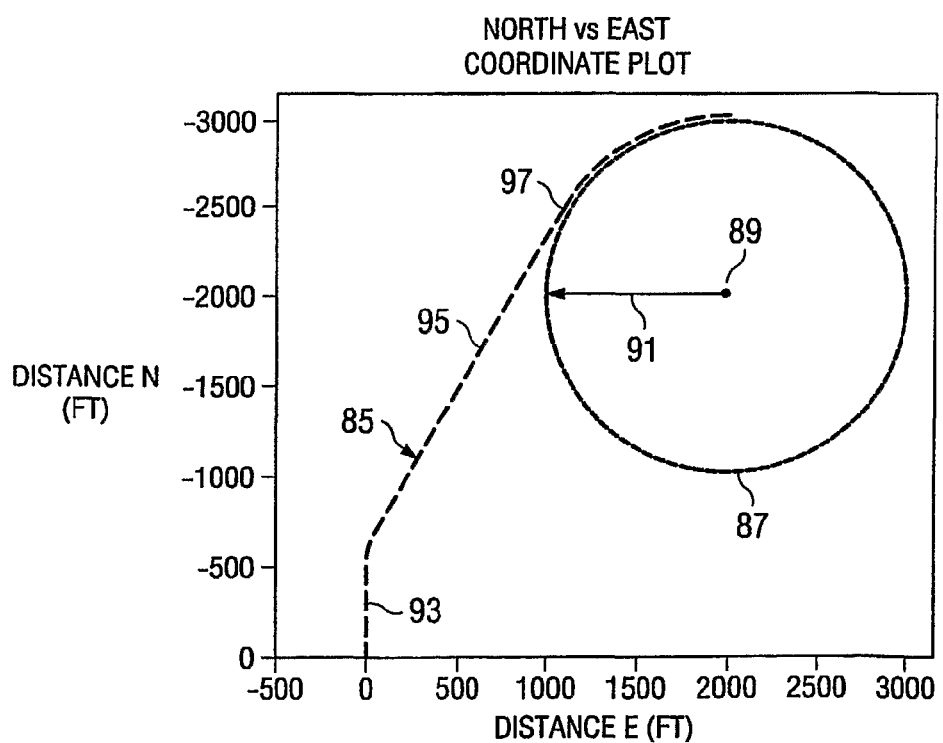
FIG. 4 is a plot of a ground track of the flight of an aircraft, the flight of the aircraft being controlled by the system of FIG.

There are two types of situations in which system 35 acts to intercept a circle: 1) when an aircraft is outside of the commanded circle as the circle command is given to system 35; and 2) when an aircraft is within the commanded circle as the circle command is given to system 35. FIGS. 4 through 8 illustrate the groundtrack for an aircraft using system 35 for situations in which an aircraft is flying northward (a heading of 0 degrees) when the circle command is received (or acted on, if input before flight). FIGS. 4 and 5 illustrate situations in which the aircraft is outside of the commanded circle, and FIGS. 6 through 8 illustrate situations in which the aircraft is inside of the commanded circle. The groundtracks do not show the altitude of the aircraft, as they are two-dimensional overhead views of the flight path.

When approaching the circle from outside of the circle, system 35 performs the following sequence:

1. Compute the distance and direction from the aircraft to the tangent point of the commanded circle
2. Command the aircraft flight path to intercept the circle at the tangent point corresponding to the commanded direction of rotation around the circle
3. Compute the velocity/distance profile (using the specified velocity ramping rate) to yield the circle velocity when intercepting the circle
4. Maintain the present commanded velocity until it is necessary to change velocity to intercept the circle at the circle velocity, and then follow the computed velocity/distance profile
5. Compute the altitude/distance profile (using the specified altitude ramping rate) to yield the circle altitude when intercepting the circle
6. Maintain the present commanded altitude until it is necessary to change altitude to intercept the circle at the circle altitude, and then follow the computed altitude/distance profile
7. When the aircraft reaches the a point within a specified range limit of the tangent point, provide a bank command for causing the instantaneous turn rate to maintain the aircraft at the circle radius about the circle center
8. Continue to command the velocity, altitude, and turn rate to continue flying the commanded circle
9. If the velocity is too high when the circle parameters are given and the aircraft passes the calculated tangent point, the aircraft will attempt another approach by recalculating a tangent point from its current location and fly the appropriate path to that point and achieve the circle FIG. 4 shows a groundtrack 85 for an aircraft that is commanded by system 35 to intercept and fly around circle 87 having center 89 and radius 91. Groundtrack 85 is plotted on a distance graph, which indicates that circle radius 91 is 1000 ft and that circle center 89 is located 2000 ft east of the initial position and heading of the aircraft and 2000 ft north of the initial position of the aircraft. Initially, the aircraft is flying along portion 93 of groundtrack 85, portion 93 being due north and along the vertical line indicating 0ft east. The circle command is acted on when aircraft has flown approximately 500 ft, and the aircraft turns to fly along a northeastward "fly-to" portion 95 to intercept a western section of circle 87 and fly around circle 87 in a clockwise direction. When the aircraft is within a selected distance of tangent point 97, system 35 provides a bank command that acts to maintain the aircraft flight path at radius 91 around center 89. As shown in the figure, the aircraft may initially fly a curved path that slightly deviates from the circumference of circle 87, though this will be corrected as system 35 acts to minimize the error using the bank command.

FIG. 5 shows a groundtrack 99 for an aircraft commanded by system 35 to intercept and maintain a circle 101 from outside circle 101. Like circle 87 of FIG. 4, circle 101 has a radius 103 of 1000 ft and a center 105 located 2000 ft east of the initial position and heading of the aircraft and 2000 ft north of the initial position of the aircraft. In this example, the aircraft is to fly around circle 101 in a counter-clockwise direction, and the initial turn of the aircraft from portion 107 to "fly-to" portion 109 directs the aircraft toward tangent point 111, which is in a southern section of circle 101. Once the aircraft is within a specified range of tangent point 111, system 35 provides a bank command to fly the aircraft around circle 101 at the selected altitude and velocity.

An aircraft may receive a command to circle when the aircraft is already within the circumference of the desired circle. When approaching the circle from inside of the circle, system 35 performs the following sequence:

1. Compute the velocity and direction to approach the circle radius from inside the circle—if the initial velocity is too high, it will be necessary to pass outside the circle and approach from the outside
2. Command the velocity and direction to intercept the circle radius
3. Start climbing or descending to achieve the circle altitude—if the circle radius is achieved before the altitude is achieved, continue to climb or descend until the desired altitude is achieved
4. When the aircraft reaches a point within a specified range limit of the circle radius, provide a bank command for causing the instantaneous turn rate to maintain the aircraft at the circle radius
5. Continue to command the velocity, altitude, and turn rate to continue flying the commanded circle FIG. 6 shows a groundtrack 113 for an aircraft commanded by system 35 to fly circle 115. Circle 115 has a radius 117 of 4000 ft and a center 119 located 3000 ft due east of the initial location of the aircraft, which places the aircraft 1000 ft within circle 115. In this example, the aircraft is to fly around circle 115 in a counter-clockwise direction, and the initial turn of the aircraft from initial portion 121 to banking portion 123 directs the aircraft toward intercept point 125, which is in a northwestern section of circle 115. The aircraft may have been traveling at a velocity high enough that the aircraft overshoots circle 115, in which case the aircraft will continue the banking maneuver to achieve the desired radius. During this time, system 35 will command the aircraft to accelerate or decelerate to achieve the desired circle velocity. Also, system 35 will command the aircraft to ascend or descend to achieve the desired circle altitude.

FIG. 7 shows a groundtrack 127 for an aircraft commanded by system 35 to fly circle 129 in a counter-clockwise direction. Like the example shown in FIG. 6, the groundtrack of FIG. 7 shows that the initial position of the aircraft is within circle 129, which has a radius 131 of 4000 ft and a center 133 located 3000 ft due east of the initial position of the aircraft. The initial turn of the aircraft from initial portion 135 to banking portion 137 directs the aircraft toward intercept point 139, which is in a southwestern section of circle 129. Because system 35 commands the aircraft to loop out of circle 129 in portion 137, the aircraft can fly to intercept point 139 with little or no overshoot and then bank to achieve and maintain the desired circle radius. During this time, system 35 will command the aircraft to accelerate or decelerate to achieve the desired circle velocity. Also, system 35 will command the aircraft to ascend or descend to achieve the desired circle altitude.

FIG. 8 also shows a groundtrack 141 commanded by system 35 to fly circle 143 in a counter-clockwise direction from an initial position within circle 143. Circle 143 has a radius 145 of 1000 ft and a center 147 located approximately 800 ft due north of the initial position of the aircraft. In the example shown, the aircraft has an initial velocity that is high enough that the aircraft would overshoot the circumference of circle 143 if the aircraft were to execute a turn toward tangent point 149 from initial portion 151. Therefore, system 35 commands the aircraft to initially turn eastward on banking portion 153 to reduce the velocity of aircraft before turning toward tangent point on banking portion 155. This allows the aircraft to intercept circle 143 at or near tangent point 149 with little or no overshoot or undershoot, then for system 35 to command a bank angle to maintain the desired circle radius. During this time, system 35 will command the aircraft to accelerate or decelerate to achieve the desired circle velocity. Also, system 35 will command the aircraft to ascend or descend to achieve the desired circle altitude.

While described above as being used with an unmanned aircraft, the system of the invention is applicable to all types of aircraft, including manned aircraft. The system of the invention may also incorporate additional features, including: automatic or autonomous search patterns; the ability to detect, follow, and circle a target; collision avoidance capability; and override methods for returning control to a pilot.

The present invention provides for several advantages, including: (1) the ability for a system to automatically operate an aircraft to fly a circle having a selected center and radius; and (2) the ability to intercept and fly a circle from an initial point located inside or outside of the circle.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A flight control system for an aircraft, the system comprising:
   means for receiving command signals representing commanded values of a location of a geospatial point and a radius about the geospatial point for defining a circular groundtrack;
   means for determining a geospatial location of the aircraft and providing a location signal representing the location of the aircraft; and
   a controller for commanding flight control devices on the aircraft for controlling the flight of the aircraft, the controller also being configured to receive the command signals and the location signal;
   wherein the controller uses the command signals and location signal to operate the flight control devices to control the flight of the aircraft for directing the aircraft toward a tangent point of the circular groundtrack for intercepting the circular groundtrack and then generally maintaining a flight path along the circular groundtrack.

2. The flight control system according to claim 1, further comprising:
   means for determining a velocity of the aircraft and providing a velocity signal representing the velocity of the aircraft;
   wherein the command signals also represent a commanded value of a circle velocity; and
   wherein the controller is also configured to receive the velocity signal and operate the flight control devices to achieve and generally maintain the circle velocity along the circular groundtrack.

3. The flight control system according to claim 2, wherein the controller comprises a ramping function for changing a current velocity of the aircraft to the circle velocity based on a distance of the aircraft from the tangent point.

4. The flight control system according to claim 1, further comprising:
   means for determining an altitude of the aircraft and providing an altitude signal representing the altitude of the aircraft;
   wherein the command signals also represent a commanded value of a circle altitude; and
   wherein the controller is also configured to receive the altitude signal and operate the flight control devices to achieve and generally maintain the circle altitude along the circular groundtrack.

5. The flight control system according to claim 4, wherein the controller comprises a ramping function for changing a current altitude of the aircraft to the circle altitude based on a distance of the aircraft from the tangent point.

6. The flight control system according to claim 1, wherein the means for receiving command signals is a receiver located on the aircraft and configured for receiving command signals transmitted from a location remote from the aircraft.

7. The flight control system according to claim 1, wherein the means for receiving command signals is a receiver located on the aircraft and configured for receiving command signals transmitted from a location remote from the aircraft, and wherein the command signals are transmitted from a ground control station.

8. The flight control system according to claim 1, wherein the means for receiving command signals is an input device located on the aircraft.

9. A method of controlling the flight of an aircraft, the method comprising:
   a) inputting command values into a flight controller, the values representing a geospatial location and a radius, wherein the location and radius define a commanded circular groundtrack;
   b) computing with the controller a distance and direction from a current location of the aircraft to a tangent point of the commanded circular groundtrack;
   c) operating with the controller at least one flight control device of the aircraft to direct the aircraft toward the tangent point;
   d) when the aircraft reaches a location within a specified range of the tangent point, operating with the controller at least one flight control device for causing an instantaneous turn rate of the aircraft that generally maintains a flight path of the aircraft along the commanded circular groundtrack.

10. The method according to claim 9, further comprising:
    inputting into the flight controller a command value representing a commanded circle velocity; and
    operating with the controller at least one flight control device for causing the aircraft to generally maintain the commanded circle velocity along the commanded circular groundtrack.

11. The flight control system according to claim 10, further comprising:
    ramping a velocity of the aircraft from a current velocity of the aircraft to the commanded circle velocity based on a distance of the aircraft from the tangent point.

12. The method according to claim 9, further comprising:
    inputting into the flight controller a command value representing a commanded circle altitude; and
    operating with the controller at least one flight control device for causing the aircraft to generally maintain the commanded circle altitude along the commanded circular groundtrack.

13. The flight control system according to claim 12, further comprising:
    ramping an altitude of the aircraft from a current altitude of the aircraft to the commanded circle altitude based on a distance of the aircraft from the tangent point.

14. An aircraft, comprising:
flight control devices for controlling a flight path, velocity, and altitude of the aircraft; and
a flight control system, comprising:
- means for receiving command signals representing commanded values of a location of a geospatial point and a radius about the geospatial point for defining a circular groundtrack;
- means for determining a geospatial location of the aircraft and providing a location signal representing the location of the aircraft; and
- a controller for commanding the flight control devices, the controller also being configured to receive the command signals and the location signal;
wherein the controller uses the command signals and location signal to operate the flight control devices to control the flight of the aircraft for directing the aircraft toward a tangent point of the circular groundtrack for intercepting the circular groundtrack and then generally maintaining a flight path along the circular groundtrack.

15. The aircraft according to claim 14, wherein the aircraft is an unmanned aerial vehicle.

16. The aircraft according to claim 14, wherein the means for receiving command signals is a receiver located on the aircraft and the command signals are transmitted to the receiver from a location remote from the aircraft.

17. The aircraft according to claim 14, further comprising:
means for determining a velocity of the aircraft and providing a velocity signal representing the velocity of the aircraft;
wherein the command signals also represent a commanded value of a circle velocity; and
wherein the controller is also configured to receive the velocity signal and operate the flight control devices to achieve and generally maintain the circle velocity along the circular groundtrack.

18. The aircraft according to claim 14, further comprising:
means for determining an altitude of the aircraft and providing an altitude signal representing the altitude of the aircraft;
wherein the command signals also represent a commanded value of a circle altitude; and
wherein the controller is also configured to receive the altitude signal and operate the flight control devices to achieve and generally maintain the circle altitude along the circular groundtrack.

* * * * *

UNITED STATES PATENT AND TRADEMARK OFFICE
CERTIFICATE OF CORRECTION

| | | |
|---|---|---|
| PATENT NO. | : 8,078,395 B2 | Page 1 of 1 |
| APPLICATION NO. | : 12/064490 | |
| DATED | : December 13, 2011 | |
| INVENTOR(S) | : Kenneth E. Builta, James E. Harris and Billy K. Gore | |

It is certified that error appears in the above-identified patent and that said Letters Patent is hereby corrected as shown below:

Column 1, line 4, insert the following:

--STATEMENT REGARDING FEDERALLY SPONSORED RESEARCH OR DEVELOPMENT

This invention was made with Government support under Contract No. DTCG23-02-C-ICGSLM, awarded by the United States Coast Guard. The Government has certain rights in this invention.--

Signed and Sealed this
Twentieth Day of March, 2012

David J. Kappos
*Director of the United States Patent and Trademark Office*